United States Patent [19]

Carrillo, Jr.

[11] 4,111,593
[45] Sep. 5, 1978

[54] WIPED CUTTER

[76] Inventor: Rolando Carrillo, Jr., 3656½ Beethoven St., Los Angeles, Calif. 90066

[21] Appl. No.: 779,688

[22] Filed: May 27, 1972

[51] Int. Cl.² ............................................. B27B 5/12
[52] U.S. Cl. ........................................ 408/204; 30/97
[58] Field of Search .......................... 30/97, 276, 278; 144/205; 408/204, 205, 703

[56] References Cited

U.S. PATENT DOCUMENTS

| 2,796,792 | 6/1957 | Dias | 30/97 X |
|---|---|---|---|
| 3,208,542 | 9/1965 | Fischer | 408/204 X |
| 3,370,352 | 2/1968 | Steely | 30/97 |
| 3,839,791 | 10/1974 | Feamster | 30/97 |
| 3,974,562 | 8/1976 | Wüchner | 30/97 |

FOREIGN PATENT DOCUMENTS 216,774  12/1909  Fed. Rep. of Germany ........... 408/204

*Primary Examiner*—Al Lawrence Smith
*Assistant Examiner*—James G. Smith
*Attorney, Agent, or Firm*—Lindenberg, Freilich, Hornbaker, Wasserman, Rosen & Fernandez

[57] ABSTRACT

A portable tool for cutting wiped-lead fillets from ends of a sleeve over a discontinuity in a cable or conduit where one or more electrical conductors have been spliced, such as telephone conductors in a lead or plastic sheath. The tool consists of a split cutter adapter having sharp teeth at one end which cut the wiped lead as the two parts fitted over the cable or conduit are rotated. A main section of the cutter adapter has a keyway for a key on the inside of a split drive barrel that fits over the cutter adapter up to the main portion. The barrel has annular ribs which fit into grooves in a hinged housing having a handle extending literally for an operator to hold the housing over the barrel while forcing the cutter adapter against the wiped lead. A gear engages the gear teeth on the barrel through the wall of the housing. That gear may be turned by a hand crank or small electric motor.

3 Claims, 6 Drawing Figures

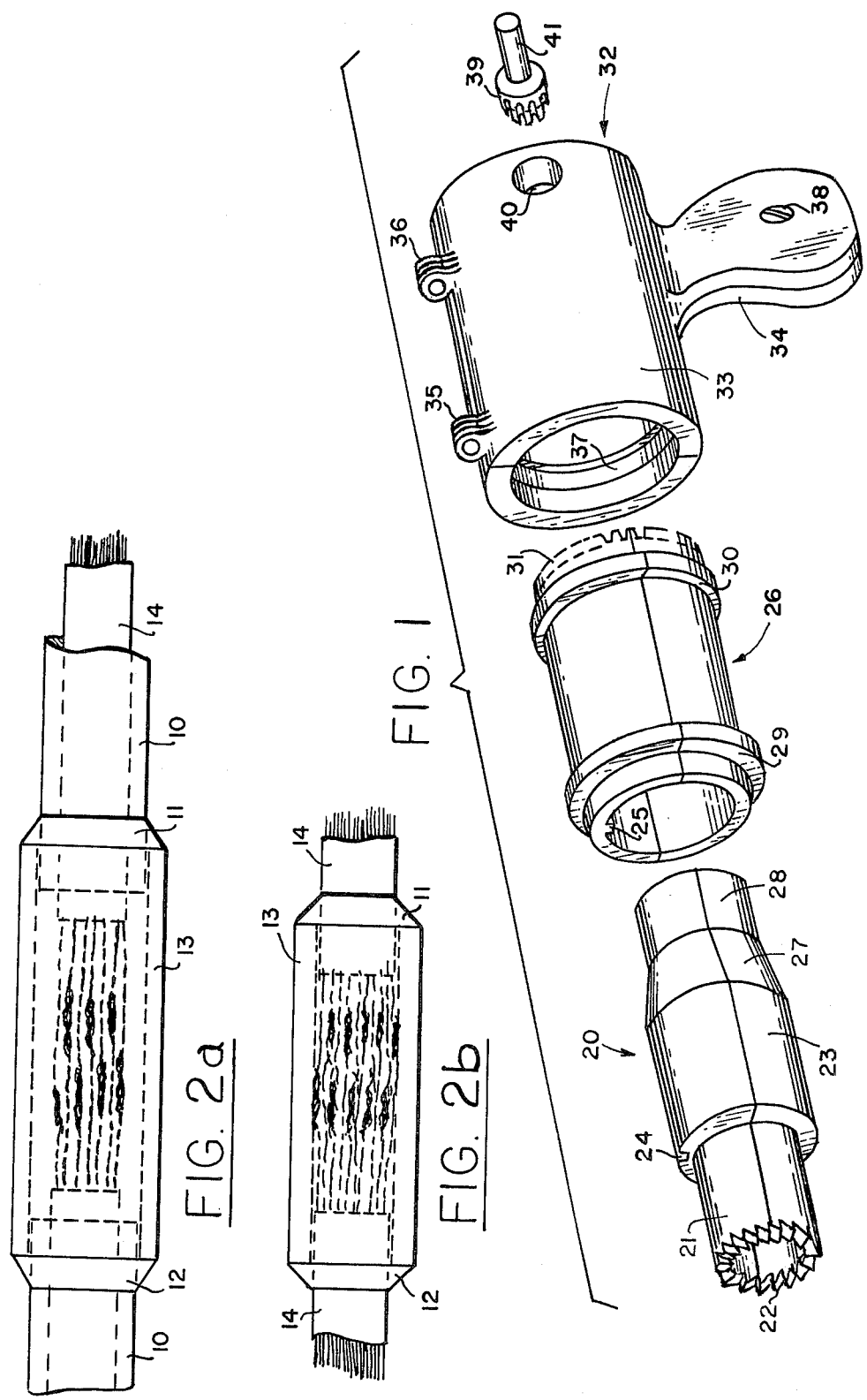

4,111,593

WIPED CUTTER

BACKGROUND OF THE INVENTION

This invention relates to a portable tool for cutting wiped-lead fillets from a sleeve over a splice on telephone cables and the like.

It is common practice to splice sections of underground cable at convenient places accessible through a manhole. To protect the cable splice, a metal sleeve is placed over the cable sheath or conduit which is discontinuous at the splice. The sleeve is long enough to overlap the ends of the cable sheath or conduit through which the conductors run. To seal the cable sheath or conduit from moisture and corrosive gases, the ends of the sleeve are wiped with lead to form a fillet around each end.

Whenever repairs are required in a cable, it is necessary to remove the sleeve over the splice, but first the fillets must be removed. The usual method for removing the fillets requires a torch. However, that method cannot be used safely to remove the fillets in a manhole due to the possibility that explosive gases will be present in the manhole. Consequently, the practice has been to remove wiped-lead fillets in a manhole by a technique which requires the use of melted lead to "wash" the wiped lead away. That requires that a worker outside the manhole heat a quantity of lead and pass it to a worker in the manhole. This method of unwiping lead is too time consuming, difficult, and not entirely free of danger since it requires workers to handle large quantities of molten lead.

OBJECTS AND SUMMARY OF THE INVENTION

An object of this invention is to provide a portable tool for the safe and quick removal of wiped-lead fillets at the ends of a sleeve over an open section of a cable sheath or conduit where a splice has been made in the cable without causing any damage to the cable sheath, or to the conduit. Briefly, the object is achieved by a hollow cylindrical cutter having an inside diameter equal to the outside diameter of the cable sheath or conduit. A central main section of the cutter of large diameter has a longitudinal keyway for engagement by a key inside a barrel which has an inside diameter slightly larger than the outside diameter of the main portion. At one end of the main section is a cylindrical section terminated with sharp teeth, and at the other end of the main section is a section in the form of a conical frustum having a base of a diameter equal to the diameter of the main section. Extending from the smaller diameter end of this frustoconical section is a cylindrical end section. The cutter is split longitudinally in order that it may be fitted over the cable conduit with the sharp teeth against the wiped-lead fillet to be cut away. Turning the cutter while it is forced against the fillet removes the lead so that the sleeve may be slipped back over the cable sheath or conduit to expose the splice. The cutter may be turned by hand, but it is preferably turned by a barrel having a length equal to about the length of main section, frustoconical section, and rear end section of the cutter. The barrel has an internal form which fits those three sections with the key inside the barrel fitted into the keyway in the main section of the cutter. There are two annular ribs outside the barrel, one near each end, which fit annular slots in a housing. The end of the barrel remote from the cutting section of the cutter is provided with gear teeth. Both the barrel and the housing are split in order that they may be fitted, one over the other, on the cutter. The housing is sufficiently long to extend over the gear teeth of the barrel, is preferably hinged, and is provided with a handle that is also split so that by gripping both parts of the handle, the housing may be held closed around the barrel. A hole is provided in the housing at one end remote from the cutting section of the cutter to receive a drive shaft with a gear on the end of it which engages the gear teeth on the end of the barrel. The drive shaft may be rotated manually by a crank, but it is preferably rotated by a small electric motor. Because brushes in electric motors do cause sparks, the electric motor may be operated outside the manhole while drive from the motor is coupled to the shaft of the gear by a flexible cable. In either case, a worker forces the entire assembly against the wiped-lead fillet that is to be cut away while the gear is driven to turn the barrel, and thereby turn the cutter. Cutters having different internal diameters may be provided for use with cable sheaths or conduits of different diameters.

The novel features of the invention that are considered characteristic of this invention are set forth with particularity in the appended claims. The invention will best be understood from the following description when read in connection with the accompanying drawings.

BRIEF DESCRIPTION OF THE DRAWINGS

FIG. 1 illustrates in isometric views the parts of a portable tool unassembled.

FIG. 2a illustrates a sleeve over a cable conduit with wiped-lead fillets at each end, and FIG. 2b similarly illustrates a sleeve over a plastic cable sheath with wiped-lead fillets at each end.

DESCRIPTION OF PREFERRED EMBODIMENTS

Figure 3:
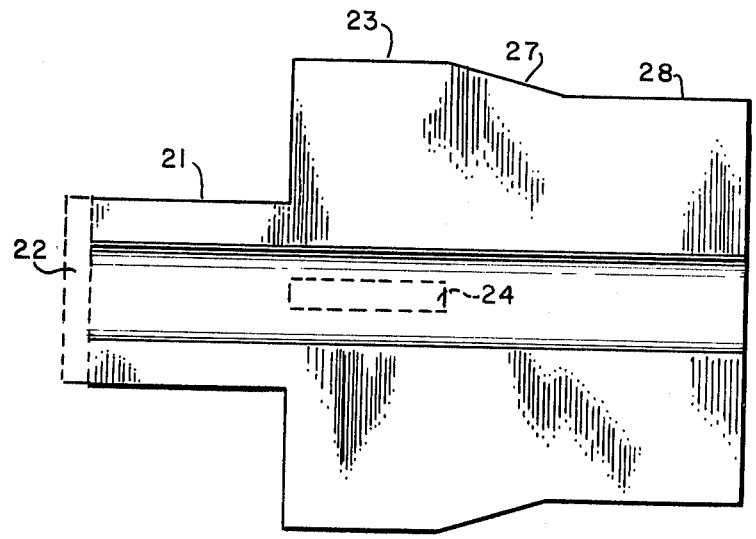
FIG. 3 is a view of half of a cutter adapter shown in FIG. 1.
Figure 4:
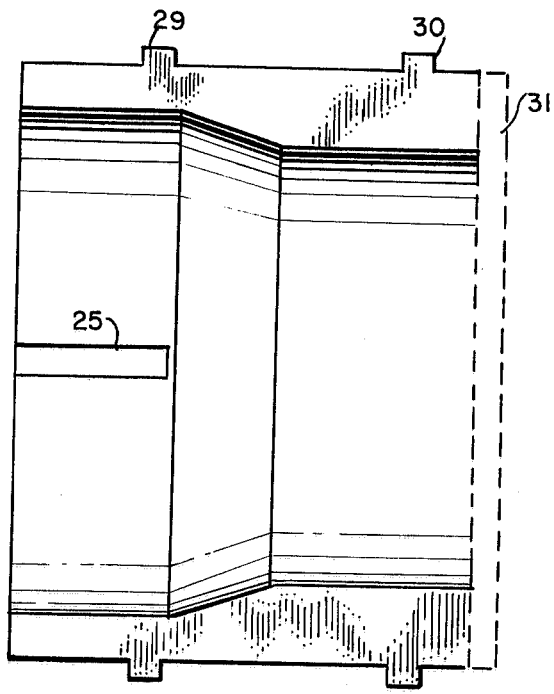
FIG. 4 is a view of half of a driee barrel shown in FIG. 1.
Figure 5:
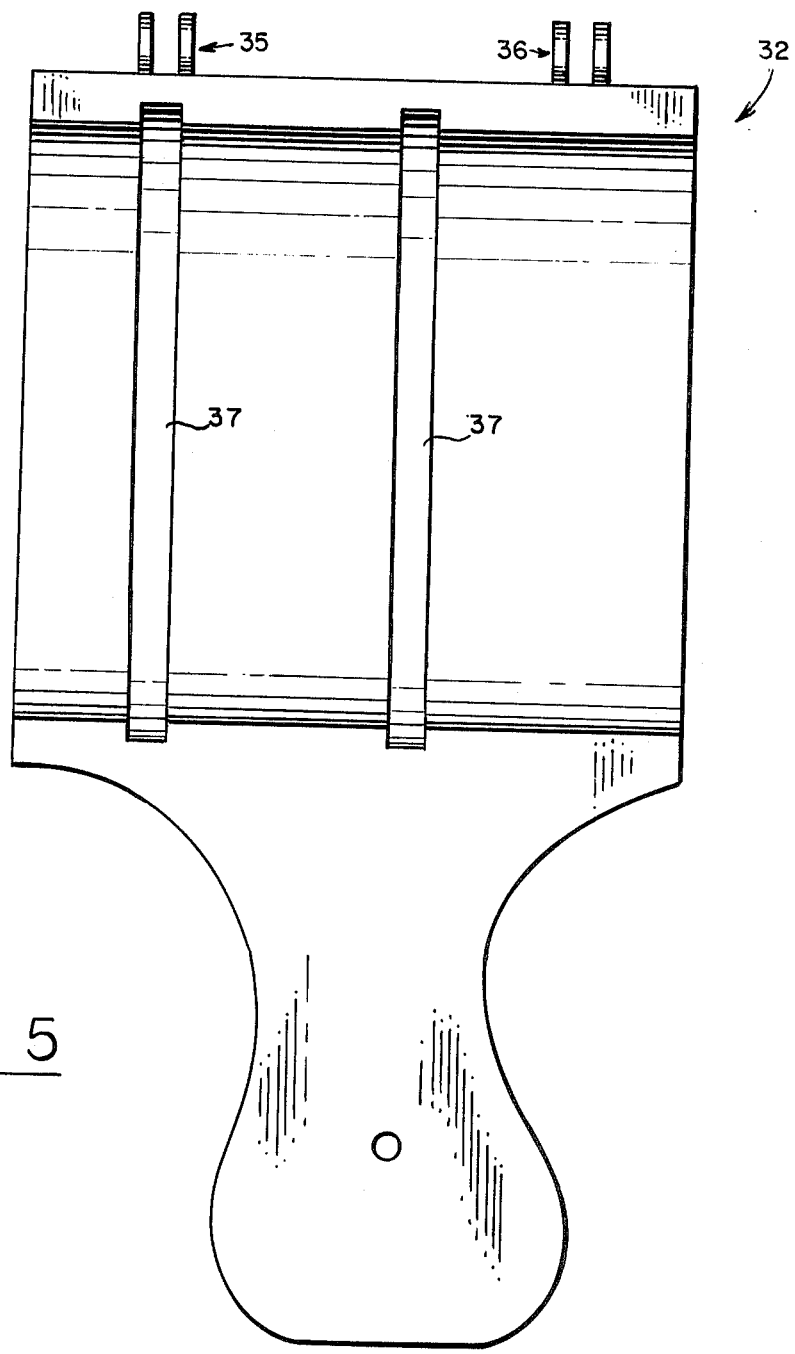
FIG. 5 is a view of half of a housing shown in FIG. 1.

Referring now to the drawings, FIG. 1 shows three parts of an unassembled portable tool designed to be assembled over a conduit 10, shown in FIG. 2a or a sheathed cable 14 shown in FIG. 2b, for the purpose of cutting away wiped-lead fillets 11 and 12 at each end of a sleeve 13 over a discontinuity where electrically insulated conductors of a sheathed cable 14 have been spliced, such as in a telephone cable. The fillets are formed by wiping melted lead over the ends of the sleeve in order to seal the cable splice inside of the sleeve.

As noted hereinbefore, it is sometimes necessary to remove the sleeve in order to gain access to the cable splice for maintenance and repair. These cables are located underground, and are reached by workers in manholes. These manholes sometimes fill with explosive gases, such as from a leak in a nearby line of a gas utility, so that it is not safe to use a blow torch to melt the wiped-lead fillets away from the sleeve and conduit. Consequently, the practice has been to wash the fillets away using melted lead which has been heated to a temperature significantly above its melting point by a worker outside the manhole. The melted lead is then passed to the worker in the manhole who quickly pours it over the fillets, thereby melting and washing the fillets away.

That "washing" procedure leaves the sleeve 13 free of any wiped lead so that it may be slipped to one side over the cable sheath or conduit to expose the splice in the cable without any damage to the conduit or the sheath of the cable. However, handling melted lead is dangerous and time consuming. The portable tool shown in FIG. 1 is adapted to be used to mechanically cut the wiped-lead fillet away from the conduit at each end of the sleeve in a quick and safe manner.

The first part of the tool is a cutter adapter 20 comprised of a cylindrical section 21 having sharp teeth 22 on the end for cutting the wiped-lead fillet. This cylindrical section is a unitary extension of a main section 23 of relatively large outside diameter but of the same inside diameter as the cylindrical section 22. A keyway 24 is cut into this main section to receive a key 25 inside a drive barrel 26 that fits over the main section.

Before describing the drive barrel further, the remaining two sections of the cutter adapter will be described. To the rear of the main section 23 is a frustoconical section 27 the base of which is of the same diameter as the main section. The frustoconical section is formed as an integral part of the main section. Extending as an integral part of the frustoconical section is a cylindrical end section 28 which has an inside diameter equal to the inside diameter of the cylindrical section 21 and an outside diameter equal to the small end diameter of the frustoconical section. This cutter adapter 20 is parted in a plane passing through the longitudinal axis so that the two halves may be easily placed over a cable sheath or conduit having substantially the same outside diameter as the inside diameter of the cutter adapter.

Once the cutter adapter has been fitted over the conduit, the drive barrel 26 is fitted over the cutter adapter with the key 25 in the keyway 24. The shape of the drive barrel conforms to the shape of the main section, frustoconical section, and cylindrical end section of the cutter adapter. Because both the main section and the cylindrical end section are of greater outside diameter than the cylindrical section 21, it may be readily appreciated that the cutter adapter may be formed with a cylindrical section having any selected internal diameter over a limited range.

In practice, a worker would have a number of cutter adapters of the same form shown, but each would have a different internal diameter for use on cables or conduits having different external diameters. Each cutter adapter fits into the drive barrel which has two annular ribs 29 and 30, one at each end of the drive barrel, and gear teeth 31 at the rear end.

The drive barrel is also parted in a plane passing through its axis so that it may be fitted over the cutter adapter. The length of the drive barrel is slightly greater than the main section, frustoconical section, and cylindrical end section, so that the gear teeth 31 will extend slightly beyond the end of the cylindrical section while the other end of the barrel is substantially even with the front end of the main section.

A housing 32 is provided in the form of a hollow cylinder 33 having an integral handgrip 34 extending from one side. The housing is parted in a plane passing through the axis of the hollow cylinder 33 and through the grip 34 so as to split the grip into two even parts. The split hollow cylinder 33 is preferably hinged as shown by hinges 35 and 36 in order to facilitate holding the housing over the barrel once it has been fitted with internal annular slots fitted over the annular ribs 29 and 30 of the barrel, such as the slot 37 at the front end of the housing which fits over the annular rib 29.

A screw 38 may be provided to hold the two parts of the handle together, but in practice it would be sufficient for the worker to hold the two parts together with his hand while he forces the sharp teeth of the cutter adapter against the wiped-lead fillet and turns the cutter adapter by turning the barrel using a gear 39 inserted into the housing through a hole 40.

The gear 39 is driven through a shaft 41 either by a hand crank, not shown, or an electrical motor, also not shown. For example, the shaft 41 could be inserted into the chuck of a hand drill in order to use the motor of the hand drill to turn the barrel, but since brushes of an electrical motor are apt to emit sparks, it may be preferable to drive the shaft 41 from a motor outside the manhole using a flexible cable to couple the shaft of the electrical motor outside of the manhole to the shaft 41 in the manhole. Once the wiped-lead fillet has been cut away by the sharp teeth of the cutter adapter, the tool is disassembled and reassembled on the other side to repeat the process. Then with both wiped-lead fillets cut away, it is possible to slide the sleeve 13 to one side over the cable sheath or conduit.

I claim:

1. A portable tool, for cutting wiped-lead fillets from ends of a sleeve over a cable sheath or conduit comprising a split, hollow and internally smooth cylindrical member having a cutting section with an internal diameter substantially equal to the outside diameter of said cable sheath or conduit, said cutting section having sharp cutting teeth extending longitudinally at one end thereof and a main section integral with the end of said cutting section opposite said one end, wherein said main section has a keyway along the outside thereof in a position parallel to the axis thereof, said tool further including: a split hollow cylindrical drive barrel having a key inside to fit said keyway when said barrel is fitted over said main section, said barrel having at least one annular rib and gear teeth at one end; a split housing of a length greater than said drive barrel for a substantial part of said housing to extend over the gear teeth at the one end of the drive barrel, said housing being shaped to fit over said barrel with a groove to receive said annular rib on said drive barrel, said housing having a split gripping member, each part of said split gripping member being integral with a different part of said split housing to permit an operator to hold said housing together; a gear fitted through said housing in engagement with said gear teeth at the one end of said drive barrel; and a drive shaft connected to said gear.

2. A tool as defined in claim 1 wherein said cutting member has hollow frustoconical section and hollow cylindrical section in tandem and integral with said main section at the end thereof remote from said cutting section, the diameter of the base of said frustoconical section being equal to the outside diameter of said main section, and the diameter of the other end of said frustoconical section being equal to the outside diameter of said tandem cylindrical section, and wherein the inside of said cylindrical drive barrel is shaped to conform to the shape of said drive barrel, frustoconical section and cylindrical section in tandem, whereby said frustoconical section serves as a bearing surface for the cutting section to be forced against said wiped lead by an operator through the housing and drive barrel.

3. A portable tool as defined in claim 2 wherein said split housing is hinged on a side thereof opposite said split gripping member.

* * * * *